United States Patent
Krishnan

(10) Patent No.: US 9,845,071 B1
(45) Date of Patent: Dec. 19, 2017

(54) KEYLESS CAR SHARING MECHANISM USING SMARTPHONES AND INBUILT WIFI SYSTEMS FOR AUTHENTICATION

(71) Applicant: Ford Global Technologies, LLC, Dearborn, MI (US)

(72) Inventor: Venkatesh Krishnan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/174,206

(22) Filed: Jun. 6, 2016

(51) Int. Cl.
*B60R 25/24* (2013.01)
*G07C 9/00* (2006.01)

(52) U.S. Cl.
CPC .......... *B60R 25/24* (2013.01); *G07C 9/00182* (2013.01)

(58) Field of Classification Search
CPC ............................ B60R 25/24; G07C 9/00182
USPC .............................................................. 701/2
See application file for complete search history.

(56) References Cited

U.S. PATENT DOCUMENTS

| | | | |
|---|---|---|---|
| 8,224,313 B2 | 7/2012 | Howarter et al. | |
| 2002/0186144 A1* | 12/2002 | Meunier ................. | G07B 15/00 340/4.6 |
| 2011/0060480 A1* | 3/2011 | Mottla .................... | G06Q 10/02 701/2 |
| 2011/0313937 A1* | 12/2011 | Moore, Jr. ......... | G06Q 30/0645 705/307 |
| 2013/0325521 A1* | 12/2013 | Jameel ................... | G06Q 10/02 705/5 |
| 2014/0129113 A1 | 5/2014 | Van Wiemeersch et al. | |
| 2014/0156111 A1 | 6/2014 | Ehrman | |
| 2014/0278599 A1* | 9/2014 | Reh .......................... | B60R 25/24 705/5 |
| 2014/0293753 A1 | 10/2014 | Pearson | |
| 2015/0048927 A1 | 2/2015 | Simmons | |
| 2015/0084739 A1 | 3/2015 | Lemoult et al. | |
| 2015/0149042 A1* | 5/2015 | Cooper ................. | B60R 16/037 701/48 |
| 2015/0161832 A1* | 6/2015 | Esselink ............ | G07C 9/00015 340/5.22 |

(Continued)

FOREIGN PATENT DOCUMENTS

CN 101527061 B 9/2009

OTHER PUBLICATIONS

Zipcar.com, "Car Sharing from Zipcar: How Does car Sharing Work?" Feb. 9, 2016, 6 pages.

*Primary Examiner* — Yazan Soofi
(74) *Attorney, Agent, or Firm* — Jason Rogers; Price Heneveld LLP

(57) ABSTRACT

A method of operating/renting keyless motor vehicles includes configuring a user's smartphone to wirelessly communicate with the security systems of at least a selected keyless vehicle, whereby the user's smartphone can transmit a digital key to the security system of a keyless vehicle to permit operation thereof. A digital key for a selected keyless vehicle is transmitted to the user's smartphone, and the user is provided with an authorization code that can be used to gain entry into the selected vehicle. The user enters the authorization code using the user input device of the selected keyless vehicle, and the user's smartphone then transmits the digital key to the security system of the selected keyless vehicle. The user can enter and operate the selected vehicle without receiving a conventional key and/or key fob.

18 Claims, 4 Drawing Sheets

(56) References Cited

U.S. PATENT DOCUMENTS

2015/0294518 A1* 10/2015 Peplin .................... B60R 25/23
                                                    340/5.22
2016/0189435 A1*  6/2016 Beaurepaire ........... G05D 1/021
                                                    705/13

* cited by examiner

KEYLESS CAR SHARING MECHANISM USING SMARTPHONES AND INBUILT WIFI SYSTEMS FOR AUTHENTICATION

CROSS REFERENCE TO RELATED APPLICATIONS

The present application is related to U.S. patent application Ser. No. 15/174,592 filed on even date herewith, entitled "KEYLESS VEHICLE SYSTEM THAT ENABLES SERVICING", the disclosure of which is hereby incorporated herein by reference in its entirety.

FIELD OF THE INVENTION

The present disclosure generally relates to keyless motor vehicles, and more particularly to a system and method for renting keyless motor vehicles that does not require transfer of a conventional key and/or key fob to a person who is renting a keyless vehicle.

BACKGROUND OF THE INVENTION

Known motor vehicles typically require a key and/or key fob to enter (unlock) the vehicle, and to operate the vehicle. One type of known system utilizes a conventional key that can be inserted into a key cylinder on the vehicle door to mechanically unlock the vehicle door. The door can then be unlatched and opened by pulling on the door handle to mechanically unlatch the door. After the user enters the vehicle, a key is inserted into the ignition key cylinder and rotated to start and operate the motor vehicle.

Wireless key fobs have also been developed. This type of system may use a wireless key fob that transmits a security code to the security system of a motor vehicle. If a user carrying an authorized key fob approaches motor vehicle, the user can unlock the door by positioning his/her hand on the vehicle door. Sensors on the handle detect the presence of the hand, and the security system unlocks the vehicle door. The user can then move the handle to mechanically unlatch and open the vehicle door. The vehicle may include a passive start system whereby a user can start and operate the vehicle if the security system detects an authorized wireless keyfob. However, these systems require that a user have physical possession of a conventional mechanical key and/or a wireless key fob that provides the authorization code for entry and/operation of a specific vehicle.

Accordingly, vehicle rental requires that a customer pick up a key and/or key fob for a specific vehicle prior to operation of the vehicle. The user must also return the key and/or key fob when the rental is completed. The requirement for a physical key and/or key fob associated with each rental vehicle may lead to various drawbacks.

SUMMARY OF THE INVENTION

One aspect of the present disclosure is a method of operating/renting keyless motor vehicles. This method includes providing one or more keyless motor vehicles, wherein each keyless vehicle has a security system including a user input device such as a touch pad on an exterior of the vehicle, and a wireless communication device that is configured to communicate with smartphones or other portable wireless devices utilizing Wi-Fi or cellular frequencies. The keyless vehicle also includes a powered latch system that is operably connected to the security system. The security system is configured to actuate the powered latch system and permit entry into the vehicle upon entry of an authorization code via the user input device. The security system is also configured to permit operation of the keyless vehicle upon receiving a signal/digital key from a wireless communication device such as a smartphone. The method includes configuring a user's smartphone or other wireless device to wirelessly communicate with the security systems of at least a selected one of the keyless vehicles, whereby the user's smartphone can transmit a digital key to the security system to permit operation of a selected keyless vehicle. The method includes providing a user with a list of keyless vehicles that are available for rental. A digital key for a selected keyless vehicle is transmitted to the user's smartphone, and the user is provided with an authorization code that can be used to gain entry to the selected vehicle. The user inputs the authorization code using the user input device of the selected keyless vehicle, and then enters the selected vehicle. The user's smartphone then transmits the digital key to the security system of the selected keyless vehicle, such that the user can enter and operate the selected vehicle without receiving a conventional key and/or key fob.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 4:
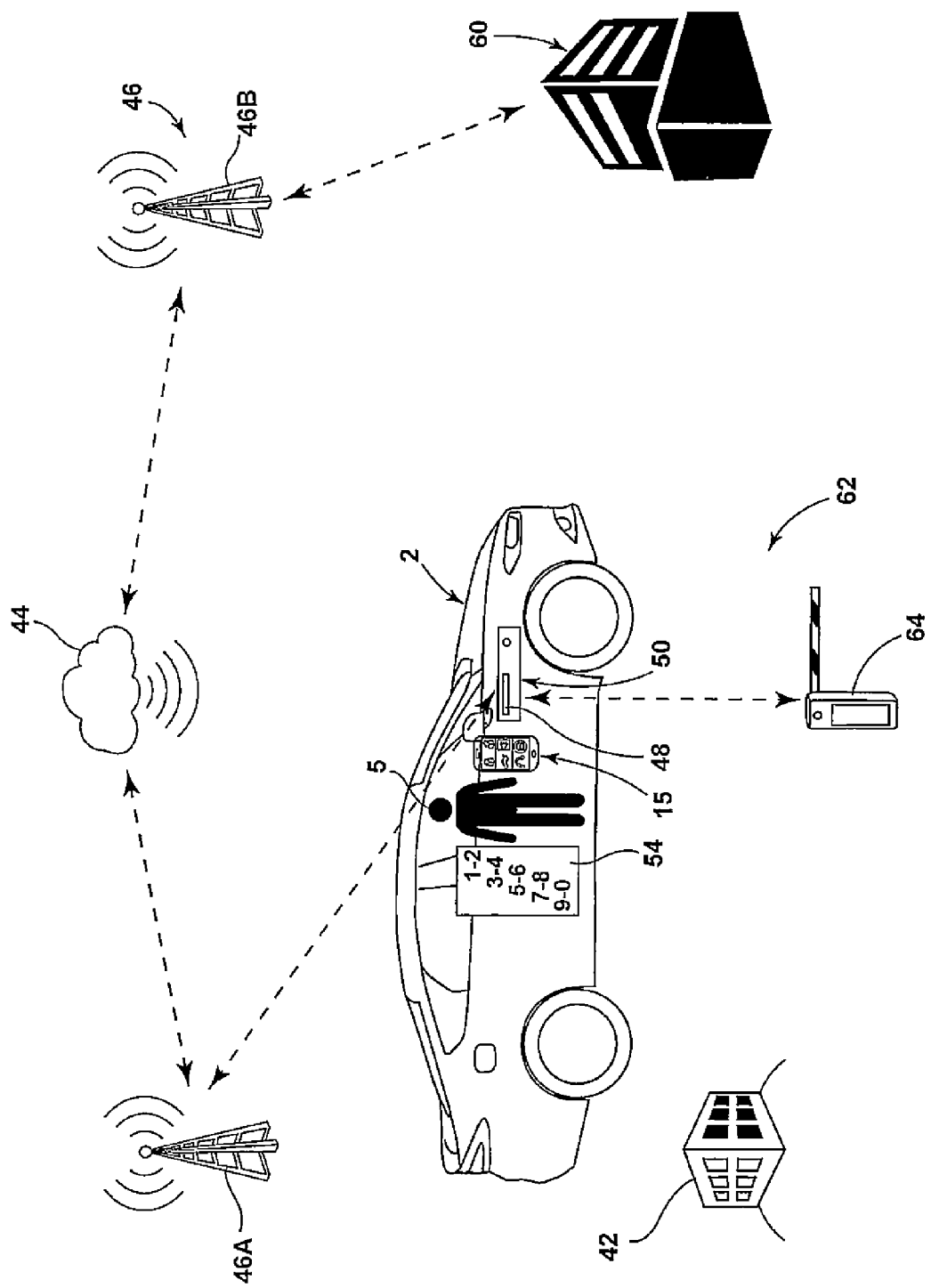
FIG. 4 is a schematic view showing starting/operation of a keyless vehicle.

For purposes of description herein, the terms "upper," "lower," "right," "left," "rear," "front," "vertical," "horizontal," and derivatives thereof shall relate to the disclosure as oriented in FIG. 4. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the concepts defined in the appended claims. Hence, specific dimensions and other physical characteristics relating to the embodiments disclosed herein are not to be considered as limiting, unless the claims expressly state otherwise.

The present application is related to U.S. Pat. No. 9,518,408 issued on Dec. 13, 2016 and entitled "ALTERNATE BACKUP ENTRY FOR VEHICLES," U.S. patent application Ser. No. 14/880,377, filed on Oct. 12, 2015 and entitled "KEYLESS VEHICLE SYSTEM," U.S. Pat. No. 9,725,070, issued on Aug. 8, 2017 and entitled "ELECTRONIC VEHICLE SECURITY SYSTEM DEVOID OF LOCK CYLINDERS," U.S. patent application Ser. No. 14/468,634, filed on Aug. 26, 2014 and entitled "KEYLESS VEHICLE DOOR LATCH SYSTEM WITH POWERED BACKUP UNLOCK" all of which are incorporated herein by reference in their entirety.

Figure 1:
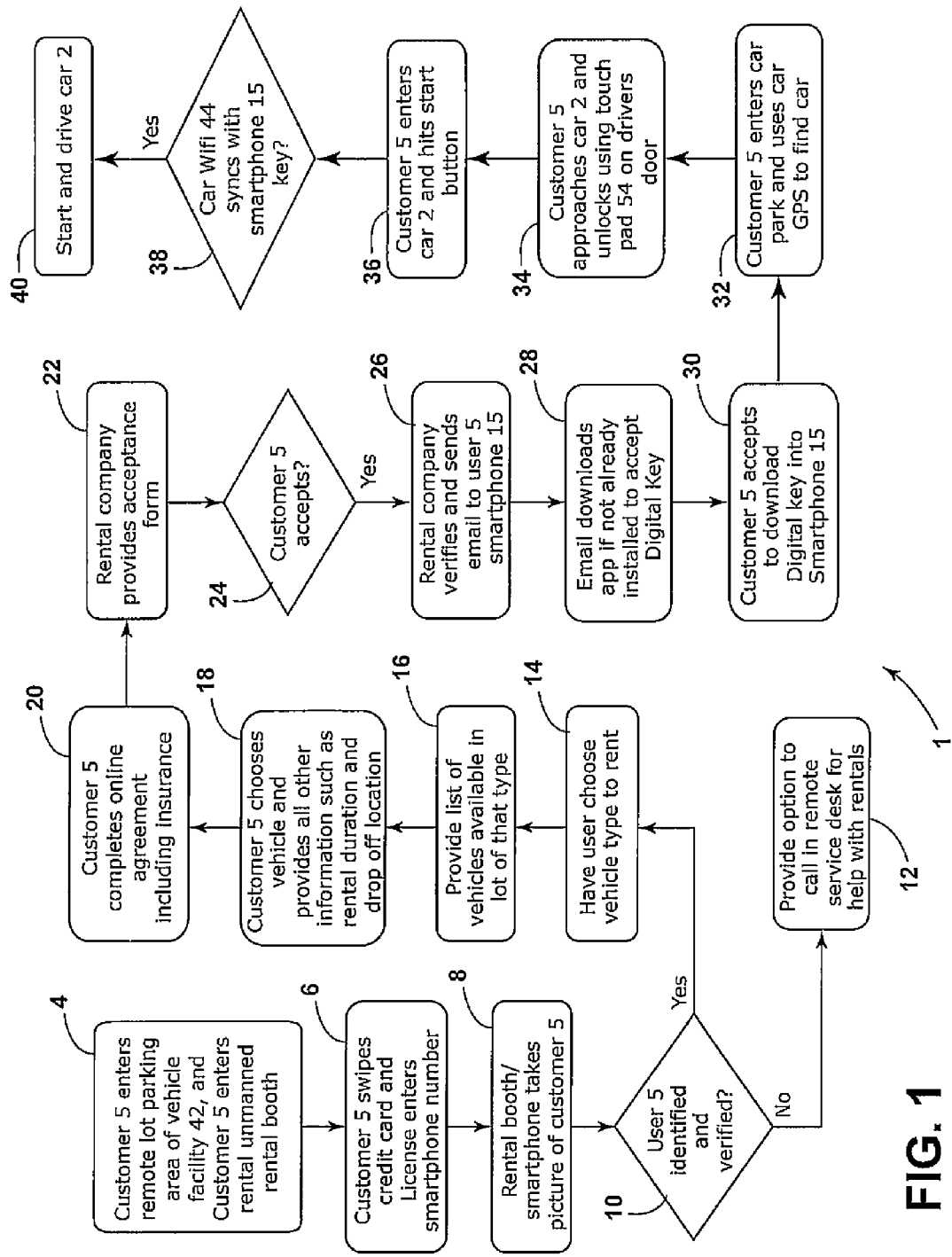
FIG. 1 is a flow chart showing a method of using/renting keyless motor vehicles.
Figure 2:
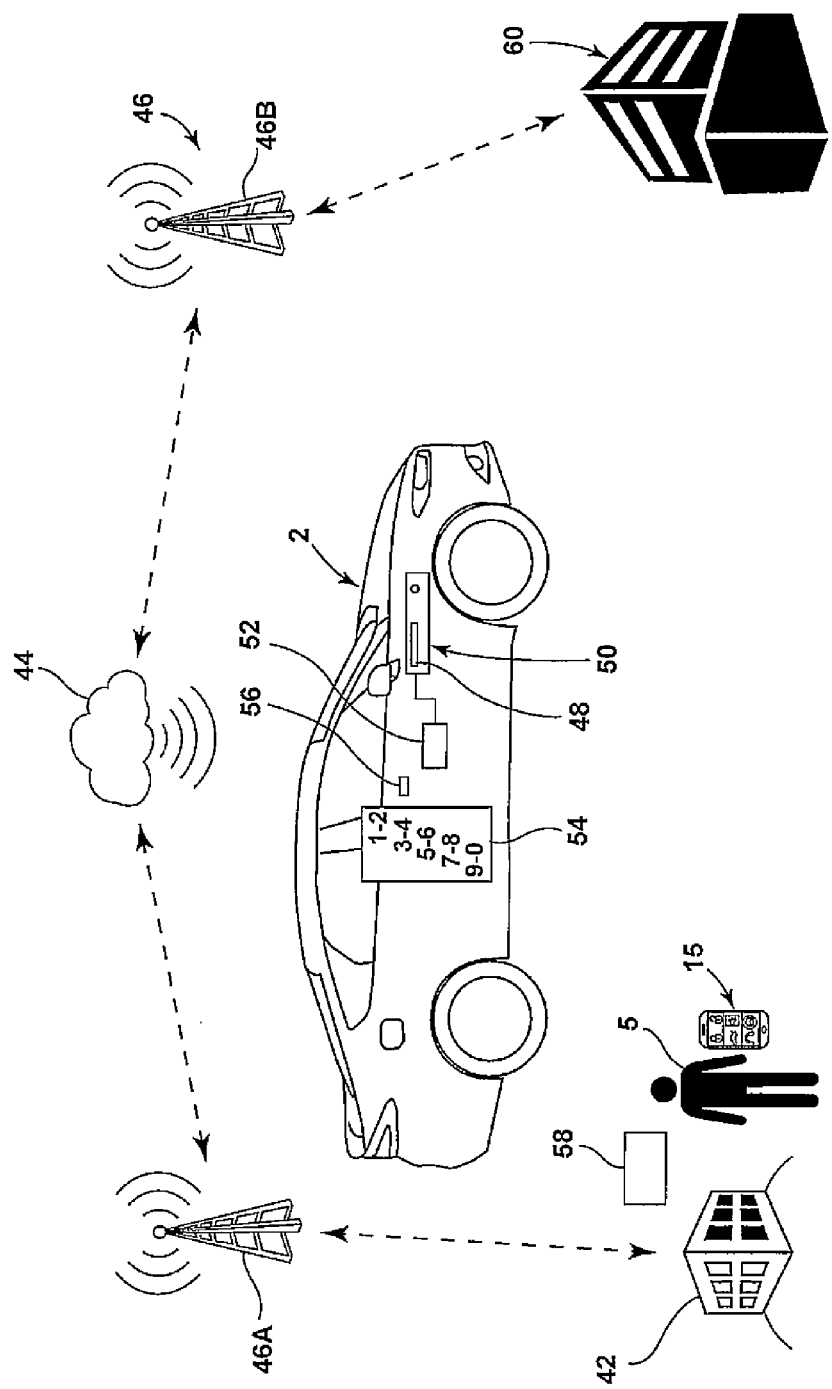
FIG. 2 is a schematic drawing showing delivery of a security code/digital key to a user's smartphone.

With reference to FIGS. 1 and 2, a process or method 1 of operating or using keyless vehicles 2 generally includes a first step 4. At step 4, a customer 5 enters a remote lot of a parking area of a vehicle rental facility 42. As discussed in more detail below, user 5 may utilize a wireless communication device such as a smartphone 15. Smartphone 15 may be configured to wirelessly communicate over a network 44 (e.g. the internet) via a cellular system 46 that includes a plurality of cell towers 46A, 46B, etc. As described in more detail in above-identified U.S. application Ser. No. 14/880, 377, the smartphone 15 may be programmed to include an app that permits the smartphone to communicate wirelessly with security system 50 of keyless vehicle 2 via a wireless communication device 48 of keyless vehicle 2. The wireless communication device 48 may be configured to communicate wirelessly with smartphone 15 utilizing Wi-Fi frequencies and/or cellular frequencies. The keyless vehicle 2 also includes a powered door latch system 52 that is operably connected to the security system 50. Keyless vehicle 2 may also include a user input device such as a touch pad 54 having a plurality of discreet inputs that can be individually activated upon contact by a user. Touch pad 54 may be positioned on an exterior of keyless vehicle 2.

As discussed in more detail below, the smartphone 15 can be configured/programmed to transmit a security code (digital key) to the security system 50 of keyless vehicle 2 via wireless communication device 48 of keyless vehicle 2, or via a USB cable or the like. To enter keyless vehicle 2, user 5 enters a specific security code utilizing touch pad 54 by contacting and actuating discreet inputs corresponding to numbers, letters, etc. After user 5 enters the security code using touch pad 54, the powered latch system 52 unlocks and/or unlatches the vehicle doors to permit user 5 to enter the vehicle 2. The powered latch system 52 may include electrically powered latches that both unlock and unlatch the vehicle doors to permit user entry. Alternatively, the powered latch system 52 may include a powered unlock feature that unlocks the vehicle door upon entry of an authorized code via touch pad 54, followed by manual/mechanical unlatching of the vehicle door by user 5 by pulling on a door handle 56. After a user 5 enters a keyless vehicle 2, the user's smartphone 15 transmits the digital key to the security system 50 whereby a user can then start and operate keyless vehicle 2. Significantly, a physical key and/or key fob is not required to enter and/or operate keyless vehicle 2. It will be understood, however, that "keyless" vehicle 2 may optionally include one or more conventional mechanical lock cylinders to permit entry and/or operation of keyless vehicle 2 using a conventional key if required due to an electrical power failure or the like. The operation of keyless vehicle 2 in connection with a smartphone 15 that acts as a wireless key fob is described in detail in co-pending U.S. application Ser. No. 14/880,377.

Referring again to FIG. 1, at the start of process 1, a customer 5 enters a remote lot parking area of a vehicle rental facility 42, and the customer 5 enters a booth or other area having an interactive screen/device 58 (FIG. 2). As shown at the step 6, the customer 5 can then enter credit card information, driver's license information, and also enters the phone number for the user's smartphone 15. The rental booth or interactive screen 58 (or user's smartphone 15) may then be used to take a picture of the user/customer 5. It will be understood that various types of interactive devices may be utilized to obtain credit card information, driver's license information, smartphone number, etc.

As shown in step 10, the system may be configured to determine if the user 5 has been identified and verified. Identification and verification may involve comparing the driver's license information to a database of known driver's licenses, and the credit card information may be checked to verify that the customer 5 is authorized to use the credit card. In the event the user is not identified and/or verified at step 10, the interactive screen 58 may be configured to provide an optional notification/message to call a remote service desk 60 associated with the rental car company for help with rental of a keyless vehicle 2. If the user is identified and verified at step 10, the interactive screen 10 may provide a list of keyless vehicles that are available according to the type of vehicle chosen by the user as shown at steps 14 and 16. As shown at step 18, customer 5 selects a keyless vehicle to enable the rental company to identify and a selected vehicle for rental. The customer 5 may also provide additional information concerning the duration of the rental, vehicle drop off location, etc.

As shown at step 20, the interactive screen 58 may provide an agreement form that may include insurance provisions as shown at step 20. As shown at step 22, the rental company provides an acceptance form. It will be understood that the agreement may be provided on interactive screen 58, or it may be transmitted wirelessly to the user's smartphone 15, or a user's computer. Similarly, the acceptance form may be provided utilizing interactive screen 58, or may be transmitted to the user's smartphone 15 or computer.

As shown at step 24, if the customer accepts the form provided by the rental company, the rental company verifies the acceptance and transmits a digital key for the selected keyless vehicle to the user by sending an email to the user's smartphone 15 as shown at step 26. The digital key may be attached to the email. Alternatively, as shown at step 28, the email may configured to download and install the program or app on user's smartphone 15 whereby the user's smartphone 15 is configured to accept a digital key corresponding to the keyless rental vehicle selected by the user 5 at step 18. As shown at step 30, the customer 5 accepts the email and downloads the digital key for the selected keyless vehicle 2 onto the user's smartphone 15. The rental company may send/transmit GPS data or other location information for the selected vehicle to the user's smartphone 15 at step 28 or step 30 (or later).

FIG. 2 generally corresponds to the steps through step 30. One or more of the steps 4, 6, 8, 12, 14, 16, 18, 20, 22, 24, 26, 28, and 30 may be conducted utilizing interactive screen 58 at vehicle rental facility 42 as described above. Alternatively, one or more of the steps may be conducted remotely (e.g. before the customer goes to rental facility 42) utilizing a computer that is operably connected with a computer system of vehicle rental facility 42 and/or a user's smartphone 15. For example, the rental car company may provide a website that permits entry of credit card information, driver's license information, information concerning available vehicles, etc., and the website, may permit user selection of a vehicle whereby a website causes and email including the digital key for a selected keyless vehicle to be emailed to the user's smartphone 15. The central rental office help desk 60 may be operably interconnected with rental booth 42 and/or the user's smartphone 15 via cellular towers 46, network 44, and/or a wifi communication system.

Figure 3:
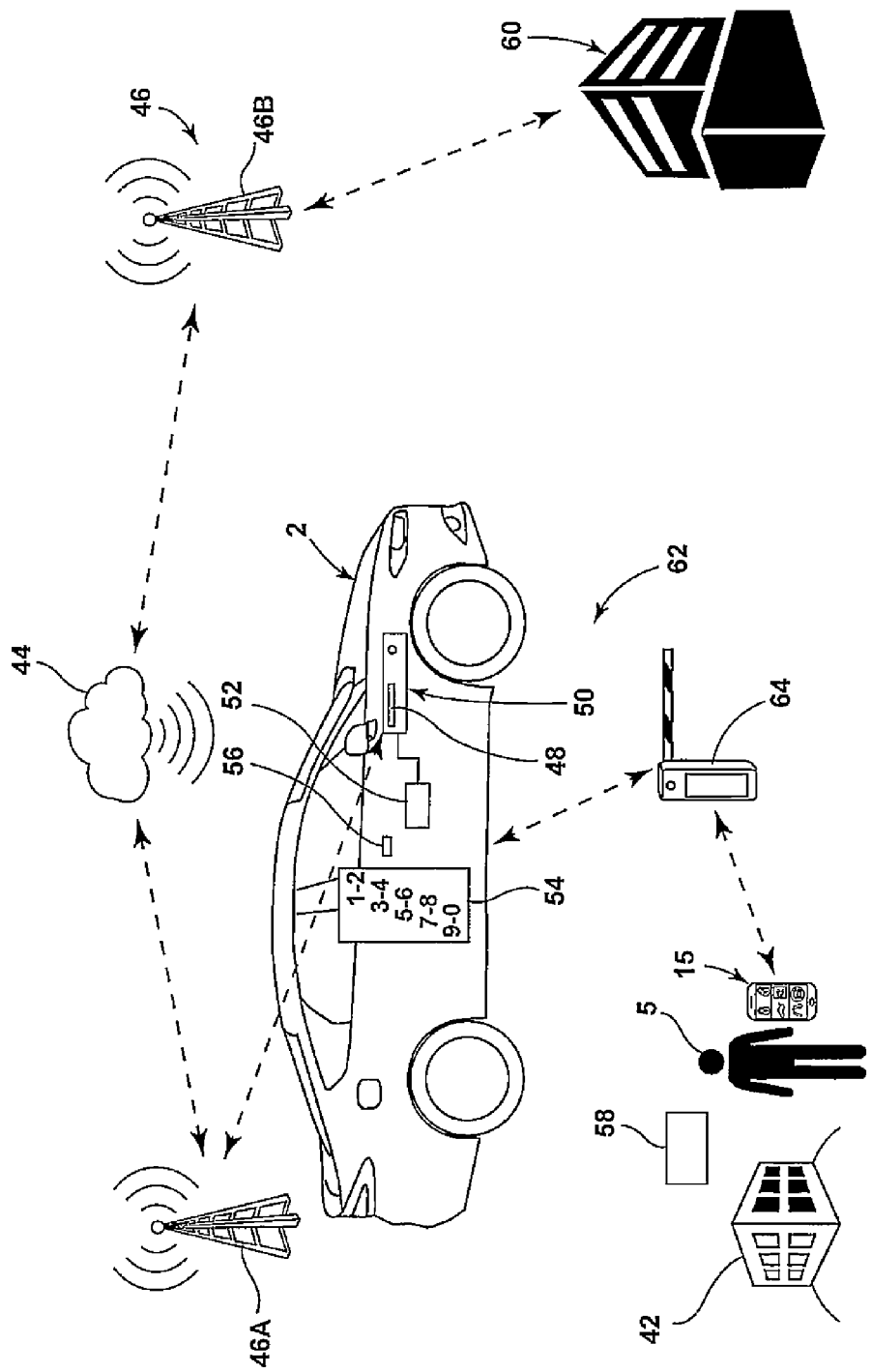
FIG. 3 is a schematic view showing access to a keyless vehicle.

Referring to FIGS. 1 and 3, at step 32 a customer 5 enters the rental facility parking lot 62 by entering a gate code at gate 64. The customer 5 may receive gate code or other access information on the user's smartphone 15 at step 28 or 30.

The customer's smartphone 15 may also receive location data such as GPS coordinates of the selected keyless vehicle 2 at step 28 or 30. The smartphone 15 may be configured to display a map showing the location of keyless vehicle 2 such that the user can locate the selected keyless vehicle 2 as shown at step 32.

At step 34 (FIG. 1), the customer 5 approaches the selected keyless vehicle 2, and unlocks the vehicle by entering a vehicle access code utilizing the touch pad 54 on the exterior of the keyless vehicle 2. The access code for entering keyless vehicle 2 may be electronically transmitted to the customer's smartphone 15 at step 28 or 30.

As shown at step 36 (FIG. 1), a customer 5 then enters the keyless vehicle 2 and hits the start button (see also FIG. 4). As shown at step 38, the wireless communication system ("Wi-Fi") 44 of keyless vehicle 2 establishes a wireless communication with customer's smartphone 15 by "syncing" with the smartphone 15. If the security system 50 determines that the digital key transmitted by the user's smartphone 15 is an authorized digital key (wireless signal), the security system 50 of keyless vehicle 2 enables the vehicle ignition. Security system 50 may optionally be configured to automatically resent after establishing wireless communication with smartphone 15 such that the user's smartphone 15 is the only smartphone that can be used to operate the selected keyless vehicle. This provides increased security to prevent unauthorized use of the vehicle 2.

At step 40 (FIG. 1), the customer 5 presses the start button and drives the selected keyless vehicle 2. The gate 64 at the rental lot 62 may be configured to wirelessly communicate with the vehicle wireless communication system 48 and/or the user's smartphone 15. If the gate 64 receives an authorized signal, the gate 64 opens, and customer 5 leaves the rental lot 62. The authorization signal required to open gate 64 may be the same digital key utilized to operate keyless vehicle 2, or it may comprise a separate code.

When a customer 5 returns the keyless vehicle 2 to the rental lot 62, the user 5 enters the rental lot 62 and exits the keyless vehicle 2. The user 5 can then use smartphone 15 to send a signal to the car rental company that the vehicle has been returned. The rental company may then send a wireless signal to the keyless vehicle 2 to deactivate the security system such that the digital key provided to the customer smartphone 15 is no longer authorized to permit operation of keyless vehicle 2. Similarly, the security system may be reset to require a different access code to be entered using touch pad 54 to prevent unauthorized re-entry of keyless vehicle 2 by a customer 5 who has ended the rental.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method of operating keyless motor vehicles, the method comprising:
    providing a plurality of keyless motor vehicles, each keyless vehicle having a security system including a user input device on an exterior of the vehicle, a wireless communication device that is configured to wirelessly communicate with smartphones, and a powered latch system including one or more electrically powered latches that are configured to both unlock and unlatch vehicle doors, and wherein the security system is configured to actuate the powered latch system to both unlock and unlatch at least one vehicle door and permit entry into the vehicle upon entry of an authorization code via the user input device, and wherein the security system is also configured to permit operation of the keyless vehicle upon receiving a digital key;
    configuring a user's smartphone to wirelessly communicate with the security systems of at least a selected one of the keyless vehicles whereby the user's smartphone can transmit a digital key to the security system to permit operation of a selected keyless vehicle;
    receiving a vehicle selection from a user to thereby identify a selected keyless vehicle that has been selected for rental;
    transmitting a digital key for the selected keyless vehicle to the user's smartphone;
    providing the user with an authorization code that can be used to gain entry to the selected vehicle;
    wherein the user enters the authorization code using the user input device of the selected keyless vehicle to both unlock and unlatch at least one vehicle door, enters the selected vehicle, and transmits the digital key to the security system of the selected keyless vehicle utilizing the user's smartphone, such that a user can enter and operate the selected vehicle without receiving a conventional key and/or key fob.

2. The method of claim 1, wherein:
    providing a user with a list of keyless vehicles that are available for rental.

3. The method of claim 2, wherein:
    the user's smartphone is configured to wirelessly communicate with the security systems of the keyless vehicles by installing a program on the smartphone.

4. The method of claim 3, wherein:
    the program is sent to the user's smartphone via email after the user has selected a keyless vehicle to rent.

5. The method of claim 1, including:
    sending the location of the selected keyless vehicle to the user's smartphone.

6. The method of claim 5, wherein:
    the location comprises GPS coordinates, and the smartphone is configured to provide a map showing the location of the selected keyless vehicle.

7. The method of claim 1, wherein:
    the user input device comprises a touch pad having a plurality of discreet inputs that can be individually actuated by contact by a user to input an authorization code.

8. The method of claim 1, wherein:
    the security system of the selected keyless vehicle is configured to establish wireless communication with the user's phone after the user enters the authorization code.

9. The method of claim 7, wherein:
    the security system automatically resets after establishing wireless communication with the user's smartphone such that the user's smartphone is the only smartphone that can be used to operate the selected keyless vehicle.

10. A method of operating keyless motor vehicles, the method comprising:
    providing a plurality of keyless motor vehicles, each keyless vehicle having a security system including a user input device on an exterior of the vehicle, a wireless communication device that is configured to wirelessly communicate with smartphones, and a powered latch system, and wherein the security system is configured to actuate the powered latch system and permit entry into the vehicle upon entry of an authorization code via the user input device, and wherein the security system is also configured to permit operation of the keyless vehicle upon receiving a digital key;

configuring a user's smartphone to wirelessly communicate with the security systems of at least a selected one of the keyless vehicles whereby the user's smartphone can transmit a digital key to the security system to permit operation of a selected keyless vehicle;

receiving a vehicle selection from a user to thereby identify a selected keyless vehicle that has been selected for rental;

transmitting a digital key for the selected keyless vehicle to the user's smartphone;

providing the user with an authorization code that can be used to gain entry to the selected vehicle;

wherein the user enters the authorization code using the user input device of the selected keyless vehicle, enters the selected vehicle, and transmits the digital key to the security system of the selected keyless vehicle utilizing the user's smartphone, such that a user can enter and operate the selected vehicle without receiving a conventional key and/or key fob; and wherein:

the selected keyless vehicle does not include a lock cylinder for mechanically unlocking the selected keyless vehicle.

11. The method of claim 1, including:

providing an interactive display at a vehicle rental facility whereby a user can enter credit card and driver's license information using the interactive display.

12. The method of claim 11, wherein:

the interactive display is configured to provide information concerning keyless vehicles that are available for rental, and a rental agreement that can be accepted by a user.

13. The method of claim 12, wherein:

the interactive display is operably connected to an electronic communication system that sends an electronic message to the user's smartphone, wherein the electronic message comprises the digital key for the selected keyless vehicle.

14. The method of claim 1, wherein:

the security systems of the keyless vehicles can be reset to require a new digital key; and including:

resetting the security system of the selected keyless vehicle after the selected keyless vehicle has been returned by a user such that the digital key that was transmitted to the user can no longer be used to operate the selected keyless vehicle.

15. A method of operating keyless motor vehicles, comprising:

receiving a vehicle selection from a remote user;

transmitting authorization and access codes to a user's smartphone;

manually entering the access code to both unlock and unlatch a vehicle door; and causing the user's smartphone to generate a wireless authorization code that is received by a selected vehicle to thereby permit the vehicle to be driven if the wireless authorization code is verified by the vehicle.

16. The method of claim 15, wherein:

the authorization code is identical to the access code.

17. The method of claim 15, including:

causing the security system of the selected vehicle to conduct a handshake operation with the first smartphone and permit operation of the selected vehicle if an authorized access code has been entered.

18. The method of claim 15, including:

providing an interactive device at a vehicle rental facility; and wherein:

the vehicle selection is entered by a user utilizing the interactive device.

* * * * *